US 10,846,127 B2

(12) United States Patent
Weld et al.

(10) Patent No.: US 10,846,127 B2
(45) Date of Patent: Nov. 24, 2020

(54) FAIR AND EFFICIENT CONCURRENCY MANAGEMENT FOR GRAPH PROCESSING

(71) Applicant: Oracle International Corporation, Redwood Shores, CA (US)

(72) Inventors: Alexander Weld, Mountain View, CA (US); Korbinian Schmid, San Mateo, CA (US); Sungpack Hong, Palo Alto, CA (US); Hassan Chafi, San Mateo, CA (US); Vlad Ioan Haprian, Zurich (CH)

(73) Assignee: ORACLE INTERNATIONAL CORPORATION, Redwood Shore, CA (US)

( * ) Notice: Subject to any disclaimer, the term of this patent is extended or adjusted under 35 U.S.C. 154(b) by 277 days.

(21) Appl. No.: 15/886,745

(22) Filed: Feb. 1, 2018

(65) Prior Publication Data
US 2019/0235913 A1 Aug. 1, 2019

(51) Int. Cl.
*G06F 9/46* (2006.01)
*G06F 9/48* (2006.01)

(52) U.S. Cl.
CPC ..................................... *G06F 9/48* (2013.01)

(58) Field of Classification Search
CPC ....................................................... G06F 9/48
See application file for complete search history.

(56) References Cited

U.S. PATENT DOCUMENTS

| | | | |
|---|---|---|---|
| 6,859,927 B2 | 2/2005 | Moody et al. | |
| 8,099,480 B1 * | 1/2012 | Muthusrinivasan | G06Q 10/06 709/222 |
| 8,756,044 B2 | 6/2014 | Mani et al. | |
| 8,819,078 B2 | 8/2014 | Roy et al. | |
| 9,116,738 B2 | 8/2015 | Jacob et al. | |
| 9,329,899 B2 * | 5/2016 | Ailamaki | G06F 9/5066 |
| 9,400,700 B2 | 7/2016 | Ekanasham et al. | |
| 9,684,944 B2 | 6/2017 | Taylor et al. | |

(Continued)

OTHER PUBLICATIONS

Khayyat et al. (Mizan: A System for Dynamic Load Balancing in Large-scale Graph processing), Eurosys '13, Apr. 15-17, Prage, Czech Republic (Year: 2013).*

(Continued)

*Primary Examiner* — Wissam Rashid
(74) *Attorney, Agent, or Firm* — Hickman Palermo Becker Bingham LLP

(57) ABSTRACT

Techniques are described herein for concurrently evaluating graph processing tasks in a fair and efficient manner. In an embodiment, a request to execute a graph processing task is received. A first mapping associates each graph processing task of a plurality of graph processing tasks to a set of workload characteristics of a plurality of sets of workload characteristics. A second mapping associates each set of workload characteristics of the plurality of sets of workload characteristics to a set of execution parameters of a plurality of sets of execution parameters. Using the first mapping, a set of workload characteristics is determined based on the graph processing task. Using the second mapping, a set of execution parameters is determined based on the determined set of workload characteristics. The graph processing task is executed based on the determined set of execution parameters.

18 Claims, 5 Drawing Sheets

Concurrent Execution Mappings

| Executable Tasks | Workload Characteristics |
|---|---|
| Graph Loading | IO_bound, long running, parallel, read write |
| Run analytics | CPU_bound, long running, parallel, read write |
| Sequential analytics | CPU_bound, long running, sequential, read write |
| Query Graph | CPU_bound, long running, parallel read write |
| Get property value | caller, interactive, sequential, read |
| Create collection from filter | CPU_bound, short, sequential, read write |
| ... | ... |

First Mapping 202

| Workload Characteristics | Execution Parameters |
|---|---|
| IO_bound, long running, parallel, read write | IO thread pool, default thread pool size |
| IO_bound, sequential | IO thread pool, thread pool size of 1 |
| CPU_bound, long running, parallel | CPU thread pool, default weight, default priority |
| CPU_bound, long running, sequential | CPU thread pool, reduced weight, default priority |
| CPU_bound, short, sequential | CPU thread pool, reduced weight, increased priority |
| Caller, interactive, sequential | Caller thread execution |
| ... | ... |

Second Mapping 204

(56) References Cited

U.S. PATENT DOCUMENTS

| | | |
|---|---|---|
| 2013/0097135 A1 | 4/2013 | Goldberg |
| 2016/0019228 A1 | 1/2016 | Hong et al. |
| 2017/0168779 A1 | 6/2017 | Sevenich et al. |

OTHER PUBLICATIONS

Xue et al., "Processing Concurrent Graph Analytics with Decoupled Computation Model", dated 2017, 15 pages.

Shang et al., "Graph Analytics Through Fine-Grained Parallelism", dated Jun. 26, 2016, 16 pages.

Gonzalez et al., "Processing Concurrent Graph Analytics with Decoupled Computation Model", dated 2014, 15 pages.

\* cited by examiner

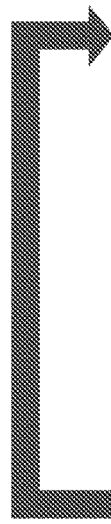

FIG. 2

Concurrent Execution Mappings

First Mapping 202

| Executable Tasks | Workload Characteristics |
|---|---|
| Graph Loading | IO_bound, long running, parallel, read write |
| Run analytics | CPU_bound, long running, parallel, read write |
| Sequential analytics | CPU_bound, long running, sequential, read write |
| Query Graph | CPU_bound, long running, parallel read write |
| Get property value | caller, interactive, sequential, read |
| Create collection from filter | CPU_bound, short, sequential, read write |
| ... | ... |

Second Mapping 204

| Workload Characteristics | Execution Parameters |
|---|---|
| IO_bound, long running, parallel, read write | IO thread pool, default thread pool size |
| IO_bound, sequential | IO thread pool, thread pool size of 1 |
| CPU_bound, long running, parallel | CPU thread pool, default weight, default priority |
| CPU_bound, long running, sequential | CPU thread pool, reduced weight, default priority |
| CPU_bound, short, sequential | CPU thread pool, reduced weight, increased priority |
| Caller, interactive, sequential | Caller thread execution |
| ... | ... |

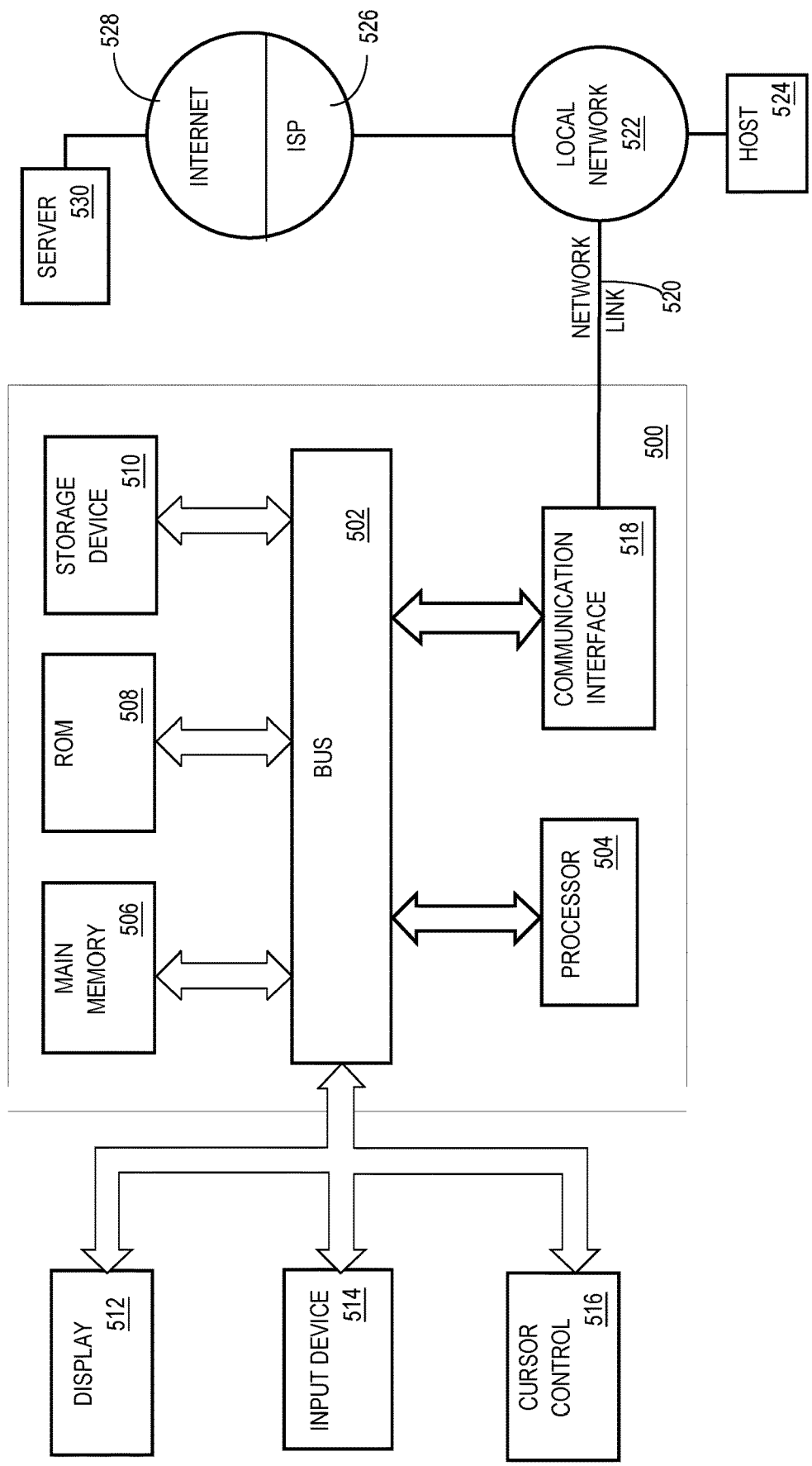

FAIR AND EFFICIENT CONCURRENCY MANAGEMENT FOR GRAPH PROCESSING

FIELD OF THE INVENTION

The present invention relates to graph processing and analytics.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph analysis is an important type of data analytics where the underlying data-set is modeled as a graph. Since such a graph representation captures relationships between data entities, applying graph analysis procedures can provide valuable insight about the original data-set. Examples of popular graph analysis procedures are Community Detection, PageRank, Finding Shortest Paths, and Link Prediction.

Sharing computing resources between clients and workloads is especially challenging in the case of graph analytics because workload characteristics are inherently very divergent. For example, some graph analytics tasks have different innate parallelism and dependency nature, some tasks might benefit from adding additional computing resources, and some tasks might be sequential in nature and adding computing resources is to no benefit. Additionally, some tasks might need to be strictly synchronized with other tasks.

Furthermore, the processing of executable tasks is rampant with performance bottlenecks. For example, for tasks that are CPU bound, the main performance bottleneck is the CPU performing computations. For tasks that are memory bound, the main bottleneck is the physical memory access time. For tasks that are IO bound, the main bottleneck is the access latency for disk based storage systems.

Currently, graph analytics systems are neglecting the issue of resource allocation control. In general, graph analytics engines either provide no support for servicing concurrent client workloads or provide rudimentary concurrency implementations with minuscule performance benefits. Additionally, graph analytics systems provide no way for clients to control resource allocation for submitted workload tasks. Techniques are desired to facilitate concurrent execution in graph analytics systems along with support for client controlled resource allocation.

Discussed herein are approaches for improving computational efficiency for graph processing concurrency.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a diagram depicting concurrent execution mappings according to an embodiment of the present invention.

FIG. 5 is a diagram depicting a computer system that may be used in an embodiment of the present invention.

DETAILED DESCRIPTION

Figure 1:
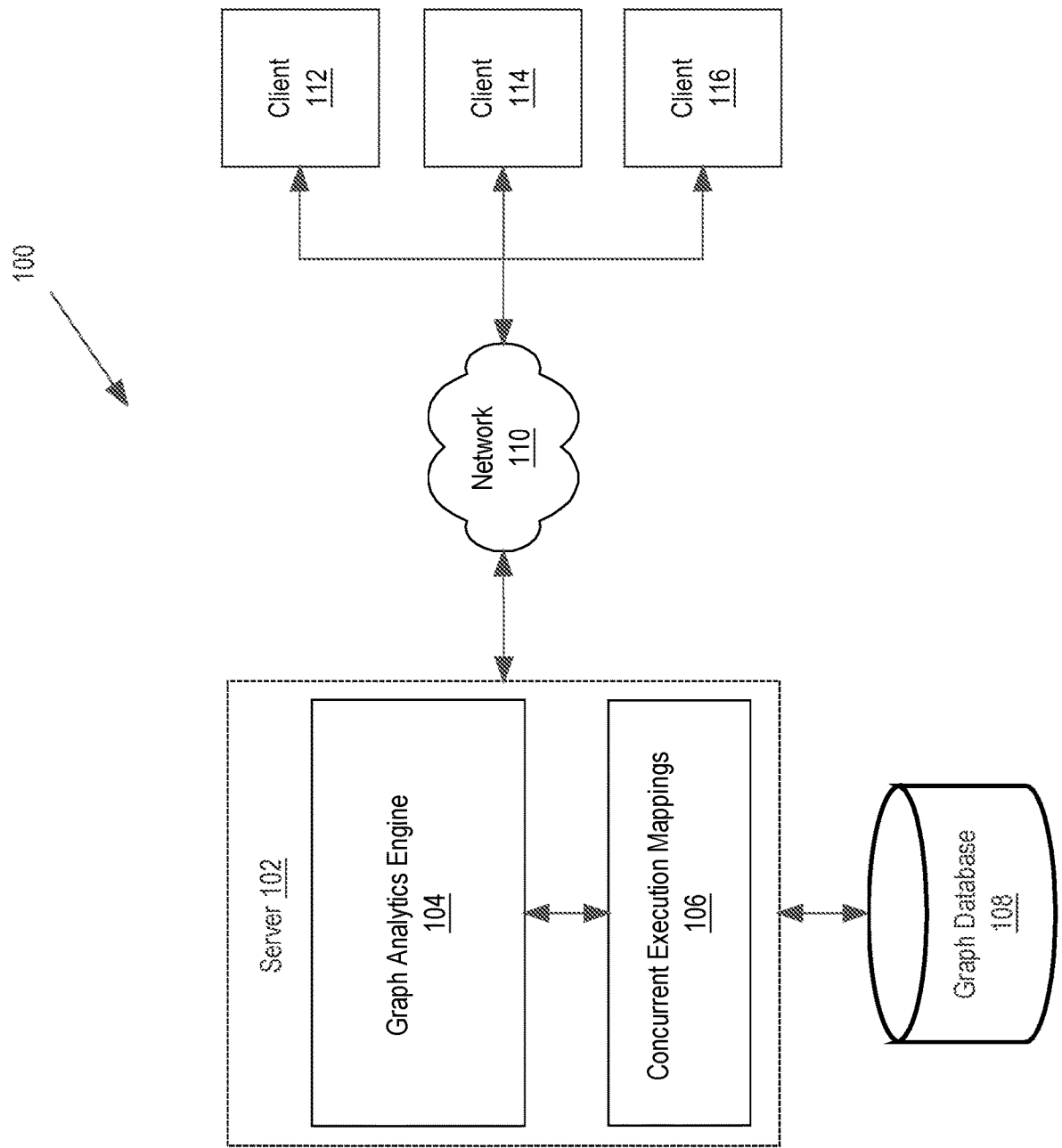
FIG. 1 illustrates an example system for evaluating a graph processing task with fair and efficient concurrency management

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for concurrently evaluating graph processing tasks in an efficient manner. As described herein, concurrent execution mappings can be used to concurrently evaluate graph processing tasks.

According to an embodiment, a first mapping associates each graph processing task of a plurality of graph processing tasks to a set of workload characteristics of a plurality of sets of workload characteristics. A second mapping associates each set of workload characteristics of the plurality of sets of workload characteristics to a set of execution parameters of a plurality of sets of execution parameters. A request to execute a graph processing task is received within a session. Using the first mapping, a set of workload characteristics is determined based on the received graph processing task. Using the second mapping, a set of execution parameters is determined based on the determined set of workload characteristics. The received graph processing task is executed within the session based on the determined set of execution parameters.

According to an embodiment, the set of workload characteristics includes at least one of: a target thread pool, a duration, a parallelism, an access, and a priority.

According to an embodiment, the set of execution parameters includes at least one of: a target thread pool, a task weight, a task priority, minimum threads, and maximum threads.

According to an embodiment, a client can override the first and second mappings on a session level basis by specifying workload characteristics and/or execution parameters via API call.

Instead of not supporting concurrent graph processing implementations or providing a rudimentary, inefficient implementation of concurrent graph processing, the concurrent execution mappings as described herein are used determine how to distribute thread pools among graph processing tasks so that graph processing tasks may execute concurrently with optimal efficiency.

Fine-Grained Concurrency Control

A graph analytics engine can be supplied in multi-user mode to serve multiple concurrent clients at the same time. A server will allocate different thread pools for different actions or tasks, such as graph processing tasks. In modern implementations, the server will allocate a fixed size thread pool for CPU bound tasks and a flexible sized thread pool for IO tasks.

In an embodiment, workload characteristics are provided to characterize workloads, such as (but not limited to):

Target thread pool: CPU bound, IO_bound, direct caller execution
Duration: Interactive, short, long running
Parallelism: Sequential, Parallel
Access: Read-only, Read-write
Priority: High, medium, low In an embodiment, a first mapping is stored that associates executable graph processing tasks with workload characteristics. This mapping of executable graph processing tasks to workload characteristics is illustrated by First Mapping 202 in FIG. 2.

FIG. 2 shows a first mapping 202 of executable graph processing tasks such as Graph Loading, Run analytics, Sequential analytics, Query Graph, Get property value, and Create collection to filter to sets of workload characteristics. For example, the 'Graph Loading' executable task is mapped to the workload characteristic set: [IO_bound, long running, parallel, read-write]. Thus, the first mapping 202 describes the workload at a high level, and is decoupled from the actual capabilities the thread pool possesses. In an embodiment, a set of workload characteristics comprises one or more workload characteristics.

The first mapping 202 shown in FIG. 2 is not intended to include an exhaustive list of executable tasks and corresponding workload characteristics, but instead serves as an example of how executable tasks may mapped to workload characteristics in context of an embodiment.

In an embodiment, tasks submitted to the CPU bound thread pool can be controlled by execution parameters such as: "task weight", "task priority", "minimum threads", "maximum threads".

In various embodiments, "task weight" supplies a relative weight on a task that decides how many threads are allocated for the task. "Task priority" provides a way to prioritize tasks over other tasks that are submitted to the thread pool. Tasks with higher priority may be executed before tasks with lower priority. If there are multiple tasks with same priority, "task weight" determines how to distribute threads to tasks with the same priority. "Minimum threads" blocks a task from execution until the specified amount of minimum threads is available in the thread pool. "Maximum threads" puts a cap on the maximum amount of threads that can be allocated for a task.

In an embodiment, execution parameters associated with tasks submitted to the IO bound thread pool can control how many threads that the task needs to execute with. For example, a user may submit a task to the IO bound thread pool with a parameter specifying '5' as the number of threads needed to execute the task.

In an embodiment, tasks submitted to the direct caller execution bound thread pool execute directly on a thread that handles a request to execute the graph processing task. For example, when a request in received to execute a graph processing task, a thread is assigned to handle the request. Tasks submitted to the direct caller execution thread pool will directly execute on the thread assigned to handle the request.

In an embodiment, a second mapping is stored that associates workload characteristics with execution parameters. This mapping of workload characteristics to execution parameters is illustrated by Second Mapping 204 in FIG. 2.

FIG. 2 shows a second mapping 204 of sets of workload characteristics such as [IO_bound, parallel], [IO_bound, sequential], [CPU bound, long running, parallel], [CPU_bound, long running, sequential], [CPU_bound, short, sequential], [Caller, interactive, sequential] to sets of execution parameters. For example, the workload characteristic set: [IO_bound, parallel] is mapped to the execution parameter set: [IO thread pool, default thread pool size]. Thus, the second mapping 204 provides how the workload characteristics are mapped to thread pools and execution parameters. In an embodiment, a set of execution parameters comprises one or more execution parameters.

The second mapping 204 shown in FIG. 2 is not intended to include an exhaustive list of workload characteristics and corresponding execution parameters, but instead serves as an example of how workload characteristics may be mapped to execution parameters in context of an embodiment.

In an embodiment, execution parameters comprise a thread pool configuration. A thread pool configuration specifies a target thread pool such as IO thread pool or CPU thread pool, the thread pool size including minimum and maximum values of the thread pool, task weight, and task priority.

In an embodiment, when a client invokes a graph processing task such as "Load Graph", the set of workload characteristics for that task are looked-up in the first mapping 202, and then using the looked-up set of workload characteristics from the first mapping 202, the corresponding set of execution parameters is looked up in the second mapping 204. The looked-up set of execution parameters is used to adjust the thread pool configuration for each task. Thus, using the first and second mappings provides fine grained control of the thread pool configuration for each task.

In an embodiment, sets of workload characteristics from the first mapping 202 are not required to exactly match to sets of workload characteristics from the second mapping 204 in order to lookup the execution parameters for a task. For example, as shown in FIG. 2, from the first mapping 202, the execution task "Run Analytics" is associated with the set of workload characteristics comprising: [CPU_bound, long running, parallel, read write]. If the second mapping 204 does not include a set of workload characteristics that includes [CPU_bound, long running, parallel, read write], the best possible match of workload characteristic sets may be used. In this example, the best possible match is the set of workload characteristics comprising [CPU_bound, long running, parallel] because the set from the second mapping 204 includes all of the workload characteristics from the set from the first mapping 202 except for the 'read write' workload characteristic. Thus, exact matching between sets of workload characteristics from the first and second mappings is not required.

Using the two mappings makes replacing the actual thread pool implementation more efficient. If a server needs to adopt a new thread pool implementation, a new mapping can be written from the workload characteristics to the new capabilities of the new thread pool. Likewise, if a server needs to update the current thread pool implementation, only the second mapping 204 needs to be updated for the new thread pool implementation.

By using both mappings, the ideal execution configuration can be established and running concurrent tasks from multiple clients can be optimized.

In previous approaches, graph analytics engines either did not support concurrency or provided rudimentary concurrency implementations with minimal technical benefits. Previously, if two client sessions were active on the server, one session would execute first and then the second session would execute after the first session was complete. Additionally, in previous implementations, tasks could be assigned to a thread pool such as IO or CPU thread pools, but no fine-grained allocation of threads from the respective pool was achieved. At best, an old system was able to run 1 IO bound task and 1 CPU bound task at same time, but not more.

As discussed herein, various embodiments allow the threads of a thread pool to be shared concurrently between tasks. For example, for a fix sized CPU thread pool with IO available threads, if two CPU bound tasks are incoming at the same time, using the first and second mappings as discussed herein, one task may be assigned 5 threads, where another task may also be assigned 5 threads, and the tasks may execute concurrently. In contrast, using old approaches, the entire CPU thread pool would be assigned to a single task, even if the task only required a small portion of the available threads in the pool. By allocating an entire thread pool to a single task, other submitted tasks would be queued and executed in sequential order, resulting processing delays and wasted resources. Various embodiments discussed herein provide for a fine-grained approach that allows mappings to dictate how many threads each task is allocated so that available threads from the CPU and IO thread pools can be tracked and allocated to concurrent processes.

API Resource Allocation Control

In an embodiment, an API is provided to clients that allows users to override mappings in two levels of complexity.

A simpler API works with the workload characteristics, whereas a complex API works directly on the thread pool configuration values such as: weight, priority, min/max threads, and pool size.

When a client connects to the analytics engine server, it creates a session that uniquely identifies the client. Each session holds an execution environment which holds parameters on how the next graph processing tasks are scheduled. Each execution environment contains parameters for: workload characteristics, thread priority/weight/max/min threads, IO thread pool size.

In an embodiment, by default, the execution environment does not contain values for any of the parameters, resulting in the execution engine using the default values from the first and second mappings when a task is submitted for execution.

In an embodiment, the client can override the first and second mappings on a session level basis. A client can override workload characteristics that are mapped to tasks specified by the first mapping. A client can also override sets of execution parameters mapped to sets of workload characteristics specified by the second mapping.

In an embodiment, a client can update the execution environment by calling various API functions. For example, if a client wants to override default workload characteristics with 'sequential' and 'interactive' they can call:
session.updateEnvironment("workloadCharacteristics", ['sequential', 'interactive']);
Graph graph=session.readGraph(graphSource);

The above code snippet will send a request to the server that updates the execution environment with the workload characteristics "sequential" and "interactive". Subsequent tasks, such as "read graph" from the code snippet above will be executed using the given workload characteristics.

Environments can be reset to their initial state using a reset method such as:
session.resetEnvironment( );

In an embodiment, a more complex API can be used to directly modify the thread pool configuration values such as: weight, priority, min/max threads, and pool size. For example, if a client wants to override default execution parameters including thread pool configuration values with a weight of 5 and priority of HIGH, they can call:
session.updateEnvironment("threadInfo", "weight": 5, "priority": HIGH);
Property rank=pagerank(graph);
session.resetEnvironment( );

As shown above, updating the environment for one call can be cumbersome. For one actual call to the server, two calls are needed to modify the execution environment (one to set it, one to reset it).

In an embodiment, a lambda call syntax is utilized to execute a lambda expression using a modified environment:
Graph graph=session.withEnvironment("workloadCharacteristics", ['sequential, 'interactive'], ( )->session.readGraph(graphSource));

A lambda expression is an expression definition that is not bound to an identifier or name, and can also be referred to as an 'anonymous' expression. Lambda syntax provides a short and concise way of expressing a complex set of tasks to be executed.

As shown in the above lambda expression, the 'withEnvironment' method takes three arguments: the target environment for update, the updated values, and a lambda function which should be executed on the changed environment. The above call is then translated into a call that sets the environment, calls the lambda function, stores the return value, and after the call returns, resets the execution environment.

Specifically, the execution of the above lambda expression is performed by executing the following four expressions:
1. Environment oldEnvironment=session.getCurrentEnvironment( );
2. session.updateEnvironment("workloadCharacteristics", ['sequential', 'interactive']);
3. Graph graph=session.readGraph(graphSource);
4. session.updateEnvironment(oldEnvironment);

The first expression is implicit and stores the configuration of the current environment before updating it. The second expression sets the environment provided as the first two arguments in the 'withEnvironment' call from the lambda expression. The third expression is the body of the lambda expression given in the 'withEnvironment' call. The fourth expression resets the environment to the value of 'oldEnvironment'.

Thus, with the lambda call syntax, 4 statements can be expressed (store old environment, set new environment, execute action, reset environment) in a single statement.

The simple API provides clients the ability to provide some abstract declarative descriptions of their workload and lets the system figure out the best way to schedule it concurrently with other tasks.

The complex API gives clients the ability to directly describe the desired scheduling settings declaratively that they want to use for their workload.

Because the client submitting the task is often the most knowledgeable regarding the optimal thread pool configuration for specific tasks, allowing a client to override the first and second mappings on a session level basis can provide enhanced efficiency and performance when executing concurrent tasks during graph processing.

Example Process

Figure 3:
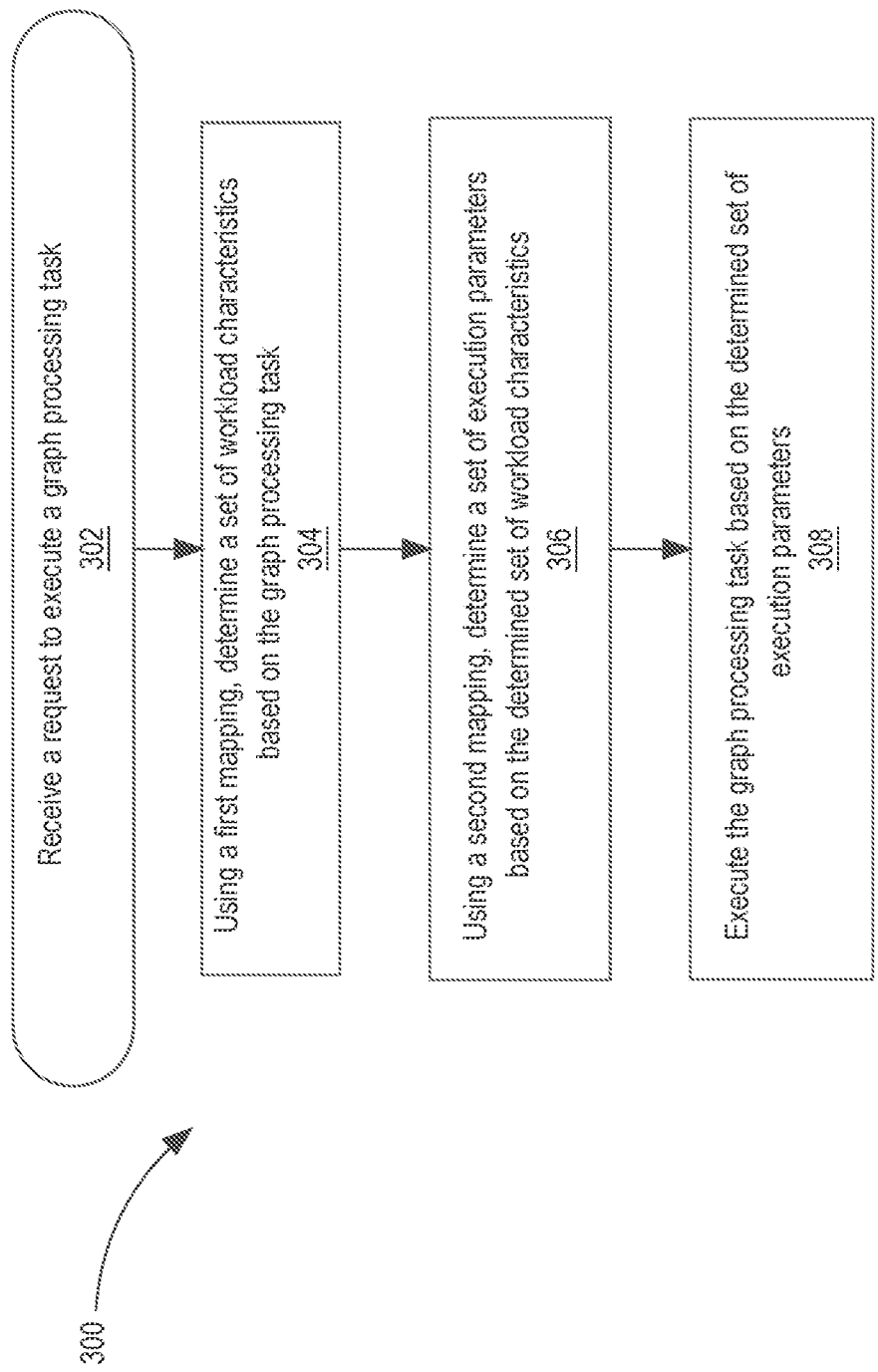
FIG. 3 is a flow chart depicting a process fine grained concurrency control according to an embodiment of the present invention.
Figure 4:
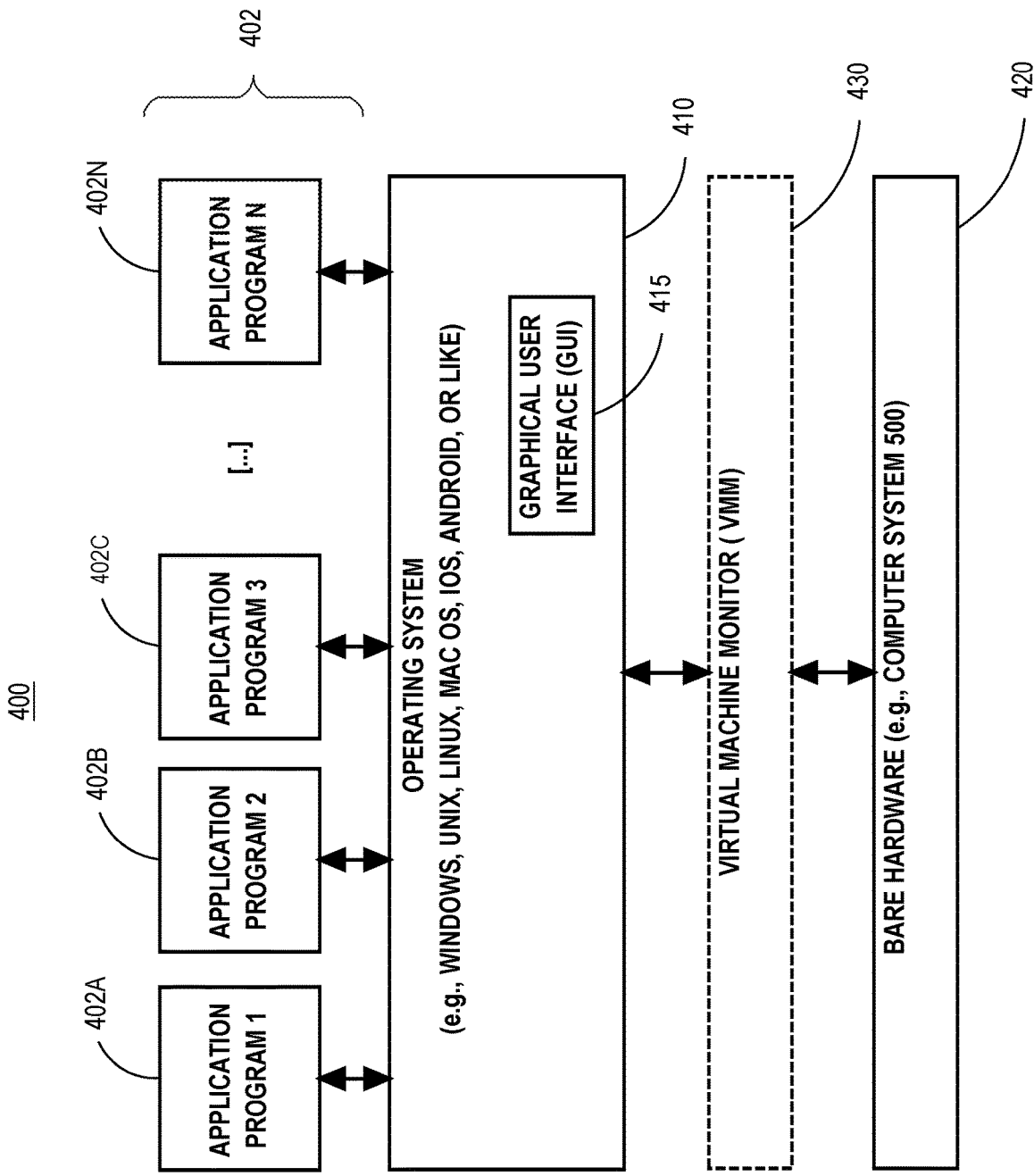
FIG. 4 is a diagram depicting a software system upon which an embodiment of the invention may be implemented.

FIG. 3 shows an example process flow 300 for fine gained concurrency control.

Flow 300 is one example of a flow for fine gained concurrency control. Other flows may comprise fewer or additional elements, in varying arrangements.

In step 302, a request to execute a graph processing task is received within a session.

In step 304, using a first mapping, a set of workload characteristics is determined based on the graph processing task. In an embodiment, the first mapping associates each graph processing task of a plurality of graph processing tasks to a set workload characteristics of a plurality of sets of workload characteristics. In an embodiment, the plurality of graph processing tasks includes the graph processing task that is included in the request.

In step 306, using a second mapping, a set of execution parameters is determined based on the determined set of workload characteristics. In an embodiment, the second mapping associates each set of workload characteristics of the plurality of sets of workload characteristics to a set of execution parameters of a plurality of sets of execution parameters.

In step 308, the graph processing task is executed within the session based on the determined set of execution parameters.

As an illustrative example, a request to execute the graph processing task "Graph Loading" is first received within a session at step 302. The set of workload characteristics mapped to the "Graph Loading" task received in step 302 is looked up using the first mapping at step 304. The set of workload characteristics mapped to the "Graph Loading" task comprises: [IO_bound, long running, parallel, read write]. The set of execution parameters mapped to the set of workload characteristics determined by step 304 is then looked up using the second mapping at step 306. The set of execution parameters mapped to the set of workload characteristics determined by step 304 (e.g. [IO_bound, long running, parallel, read write]) comprises: [TO thread pool, default thread pool size]. At step 308, the graph processing task "Graph Loading" that was received in step 302 is executed using the execution parameters determined in step 306 (e.g. [TO thread pool, default thread pool size]).

System Overview

FIG. 1 illustrates an example system for evaluating a graph processing task with fair and efficient concurrency management. In an embodiment, an example system may include a server 102, graph analytics engine 104, concurrent execution mappings 106, graph database 108, clients 112, 114, 116, and network 110.

The graph analytics engine 104 performs one or more graph analytic operations on a graph that is loaded from graph database 108. A graph includes nodes and edges which are stored in graph database 108. The graph analytics engine 104 may be implemented in hardware, software, or any combination of hardware and software. For example, the graph analytics engine 104 may execute on one or more nodes, each comprising one or more processors and memory (such as random access memory (RAM)) that stores software instructions that, when executed, cause the one or more processors to perform graph analytics operations, such operations including generating data in-memory or persistently, including generating results that are returned to clients 112, 114, 116 of the graph analytics engine 104. Even though FIG. 1 depicts a single element for a graph analytics engine 104, graph analytics engine 104 may be implemented on a single computing device or on multiple computing devices.

The graph analytics engine 104 functions as a server for clients 112, 114, and 116. Each client connects to the graph analytics engine 104 and requests certain types of tasks, such as loading a graph into memory and performing graph analytic operations, including returning information about a graph, adding nodes and edges to a graph, deleting nodes and edges from a graph, and updating properties or attributes of nodes/edges of a graph. Thus, graph analytics engine 104 translates client requests into graph operations that a storage device that stores graph database 120 recognizes or is configured to process.

Client requests (e.g., from clients 112, 114, 116) may conform to a standard or proprietary set of APIs, such as BluePrint API, and may also conform to a custom API, as discussed herein.

A client 112, 114, 116 may connect to the server 102 on a session level basis. A session is a particular connection established for a client 112, 114, 116 to a server 102 through which the client 112, 114, 116 issues a series of requests (e.g., requests for execution of graph processing tasks). The server 102 may maintain session state data about the session. The session state data reflects the current state of the session and may contain the identity of the client 112, 114, 116 for which the session is established, services used by the client, and other information. The current state of the session is all of the session state data associated with a port associated with the database session. Subsequent commands received over the port are assumed by the server 102 to be associated with all of the session state data associated with the port until such session is terminated. When the session is terminated, the session state data is deleted.

When a new session is established on the port, the client 112, 114, 116 determines new session state data to use for the new session and directs the server to load the new session state data for the new session.

Connections are mechanisms for enabling sessions. A connection may refer to either a physical mechanism, such as a physical port, or a logical connection mechanism, or both. Often, there is a one-to-one mapping of logical connections to physical connections; however, it is possible to have more than one logical connection associated with a single physical connection or more than one physical connection associated with a single logical connection.

In an embodiment, when a client 112, 114, 116 connects to the server 102, a session is created that uniquely identifies the client 112, 114, 116. Multiple sessions may be active concurrently. A client 112, 114, 116 may submit graph processing tasks via the network 110 to be executed by the graph analytics engine 104. A client 112, 114, 116 may override the concurrent execution mappings 106 on a session level basis using an API, as discussed herein.

Graph analytics engine 104 and/or server 102 may have access to storage device(s), which may include an allocated portion of memory in server 102, disk storage in an underlying database, or some other non-transitory storage.

Graph database 108 stores graph data about one or more graphs, each comprising multiple nodes and edges. If graph database 108 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph analytics engine 104 may use concurrent execution mappings 106 and the graph database 108 to service concurrent client workloads and execute graph processing tasks, as discussed herein.

Concurrent execution mappings 106 may be represented by data structures such as tables, as shown graphically as the concurrent execution mappings in FIG. 2. Concurrent execution mappings 104 may be persisted in memory or on-disk using a variety of data structures. Concurrent execution mappings 104 can be configured by a configuration file in any format. For example, both mappings could be written into a JSON file and read by the graph analytics engine at startup.

Clients 112, 114, 116 broadly represents any computing device that is separate from the server 102, such as a laptop computer, desktop computer, tablet computer, smartphone, workstation, or other computer, and that is associated with a client 112, 114, 116 or other end user who connects with the server 102.

Network 110 may be implemented by any medium or mechanism that provides for the exchange of data between the various elements of FIG. 1. Examples of network 110 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 110 is shown as a single element but in practice, network 110 may comprise one or more local area networks, wide area networks, and/or internetworks. The various elements of FIG. 1 may also have direct (wired or wireless) communications links, depending upon a particular implementation.

For purposes of illustrating a clear example, FIG. 1 illustrates three clients 112, 114, 116, and single instances of certain other elements. Other embodiments may implement any number of clients or other elements. For example, the server 102 may be deployed as two or more computers, clusters, containers, and/or virtual machine instances in one or more physical or virtual machines that are co-located, separate, and/or located in shared computing facilities such as cloud computing datacenters.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 402N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 402 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, within a session, a request to execute a graph processing task;
   using a first mapping, determining a particular set of workload characteristics based on the graph processing task, wherein said first mapping associates each graph processing task of a plurality of graph processing tasks to a set of workload characteristics of a plurality of sets of workload characteristics, the plurality of graph processing tasks including said graph processing task;
   using a second mapping, determining a particular set of execution parameters based on the particular set of workload characteristics, wherein said second mapping associates each set of workload characteristics of the plurality of sets of workload characteristics to a set of execution parameters of a plurality of sets of execution parameters;
   executing, within the session, said graph processing task based on the particular set of execution parameters.

2. The method of claim 1, wherein the particular set of workload characteristics includes at least one of: a target thread pool, a duration, a parallelism, an access, and a priority.

3. The method of claim 1, wherein the particular set of execution parameters includes at least one of: a target thread pool, a task weight, a task priority, minimum threads, and maximum threads.

4. The method of claim 1, wherein the graph processing task is submitted to a CPU bound thread pool that is controlled by execution parameters including at least one of: a task weight, a task priority, minimum threads, and maximum threads.

5. The method of claim 1, wherein the graph processing task is submitted to an input and output (I/O) bound thread pool that is controlled by execution parameters that specify how many threads that the graph processing task needs to execute with.

6. The method of claim 1, wherein the graph processing task is submitted to a caller execution thread pool that executes on a thread that is assigned to handle a request to execute the graph processing task.

7. The method of claim 1, wherein the first mapping and the second mapping are configurable by a configuration file.

8. The method of claim 1, further comprising:
   receiving, within the session, a modified set of workload characteristics;
   overriding the first mapping based on the modified set of workload characteristics;
   wherein executing said graph processing task includes executing said graph processing task based on overriding the first mapping.

9. The method of claim 1, further comprising:
receiving, within the session, a modified set of execution parameters;
overriding the second mapping based on the modified set of execution parameters;
executing, within the session, said graph processing task based on overriding the second mapping.

10. One or more non-transitory computer-readable storage medium storing instructions that, when executed by one or more processors, cause the one or more processors to perform a method comprising:
receiving, within a session, a request to execute a graph processing task;
using a first mapping, determining a particular set of workload characteristics based on the graph processing task, wherein said first mapping associates each graph processing task of a plurality of graph processing tasks to a set of workload characteristics of a plurality of sets of workload characteristics, the plurality of graph processing tasks including said graph processing task;
using a second mapping, determining a particular set of execution parameters based on the particular set of workload characteristics, wherein said second mapping associates each set of workload characteristics of the plurality of sets of workload characteristics to a set of execution parameters of a plurality of sets of execution parameters;
executing, within the session, said graph processing task based on the particular set of execution parameters.

11. The non-transitory computer-readable storage medium of claim 10, wherein the particular set of workload characteristics includes at least one of: a target thread pool, a duration, a parallelism, an access, and a priority.

12. The non-transitory computer-readable storage medium of claim 10, wherein the particular set of execution parameters includes at least one of: a target thread pool, a task weight, a task priority, minimum threads, and maximum threads.

13. The non-transitory computer-readable storage medium of claim 10, wherein the graph processing task is submitted to a CPU bound thread pool is controlled by execution parameters including at least one of: a task weight, a task priority, minimum threads, and maximum threads.

14. The non-transitory computer-readable storage medium of claim 10, wherein the graph processing task is submitted to an input and output (I/O) bound thread pool that is controlled by execution parameters that specify how many threads that the graph processing task needs to execute with.

15. The non-transitory computer-readable storage medium of claim 10, wherein the instructions include instructions for submitting the graph processing task to a caller execution thread pool executing on a thread that is assigned to handle a request to execute the graph processing task.

16. The non-transitory computer-readable storage medium of claim 10, wherein the first mapping and the second mapping are configurable by a configuration file.

17. The non-transitory computer-readable storage medium of claim 10, wherein the instructions include instructions that, when executed by said one or more processors, cause:
receiving, within the session, a modified set of workload characteristics;
overriding the first mapping based on the modified set of workload characteristics;
wherein executing said graph processing task includes executing said graph processing task based on overriding the first mapping.

18. The non-transitory computer-readable storage medium of claim 10, wherein the instructions include instructions that, when executed by said one or more processors, cause:
receiving, within the session, a modified set of execution parameters;
overriding the second mapping based on the modified set of execution parameters;
executing, within the session, said graph processing task based on overriding the second mapping.

* * * * *